United States Patent Office 3,321,437
Patented May 23, 1967

3,321,437
CRYSTALLISING LINEAR POLYESTERS FROM SYMMETRIC DICARBOXYLIC COMPOUNDS AND UNSYMMETRIC DIOLS
Isaac Goodman, James Eric McIntyre, and James Walter Stimpson, Harrogate, England, assignors to Imperial Chemical Industries Limited, London, England, a corporation of Great Britain
No Drawing. Filed Feb. 11, 1963, Ser. No. 257,768
Claims priority, application Great Britain, Feb. 19, 1962, 6,291/62
16 Claims. (Cl. 260—47)

The present invention relates to crystallising polyesters, more particularly to polyesters having an irregular structure and which are crystalline.

In the past it has been considered that the capacity for the crystallisation of fibre-forming polymers was related to the regularity of the chemical structure of such polymers. For example C. W. Bunn in R. Hill's "Fibres From Synthetic Polymers" (Elsevier, 1953), states on page 232, referring to normally crystalline fibres, that "The molecules . . . are also arranged side by side with the full three dimensional order which is implied in the word 'crystalline'." Again, on page 233, he states "the connection between crystallisability and molecular regularity of structure would appear to be almost axiomatic."

Practical experience heretofore has generally supported these propositions insofar as polymers derived from the condensation of two bifunctional intermediates, one of which is asymmetrically composed in the sense that its combination can occur in two geometrically non-identical modes with respect to the growth of the polymer chain from one end, are normally amorphous. The intermediates of the types referred to are, for example, dicarboxylic acids or dihydroxylic compounds or their functional derivatives, whose molecules are asymmetrical when viewed transversely to the direction of combination to form the polymer chain. The phenomenon here described is to be distinguished from the case of polymers constituted from symmetrical elements which fail to crystallise readily because of molecular impediments which reduce the rate of crystallisation to impracticably long periods but whose structures none the less conform to the accepted theoretical criteria for the potential display of crystallinity.

Examples of non-symmetrical linear polyesters which are amorphous in accordance with the normal theoretical expectation, include the polyesters derived from 1:2-propylene glycol and 1:3-butylene glycol. In R. Hill's "Fibres From Synthetic Polymers" (Elsevier, 1953), page 151, it is stated "Glycols containing lateral methyl groups have been condensed with terephthalic acid or esters to give high polymers, but where these methyl groups are unsymmetrically disposed, the polymers are glassy and of lower melting point. Polyesters obtained, for example, by use of 1:2-propylene glycol and 1:3-butylene glycol, i.e. of the structures,

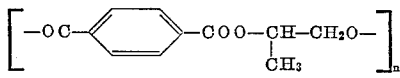

and,

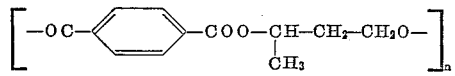

melt at 122° and 80° respectively, and are of no value for fibres. Presence of the side chains in these unsymmetrical positions produces structural disorder and thus difficulty in crystallisation."

We have now found that linear polyesters, unexpectedly showing crystallinity, can be formed by the combination of residues from certain asymmetrically constituted diols with symmetrical acids. By crystallinity is meant the possession of the capacity to diffract X-rays discretely, to show birefringence in the solid state, and (unless thermal decomposition first supervenes) to undergo on heating a first order phase transformation of melting from the opaque, birefringent condition to the completely liquid state. The utility of the products of the invention lies in the known advantage of the occurrence of crystallinity in fibre-forming synthetic polymers which allows them to be dimensionally stable to considerably higher temperatures than analogous non-crystalline substances, and also to resist the action of solvents in which analogous amorphous polymers are normally readily soluble. The products of our invention are also suitable for forming into coherent films and into other shaped articles.

According to the present invention we provide novel, linear, fibre- and film-forming crystalline polyesters containing repeating units of the formula:

(a) 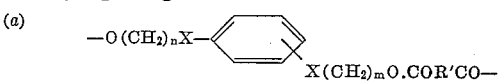

of the formula:

(b) 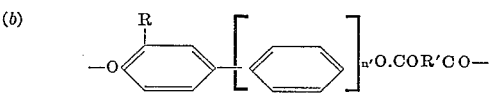

of the formula:

(c) 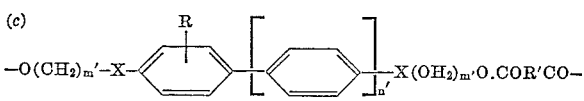

and of the formula:

(d)     

where

—($C_{10}H_6$) is the naphthylene group disubstituted in the 1:2, 1:3, 1:6 or 1:7 positions,
$n$ and $m$ are dissimilar integers,
$n'$ is 0 or 1,
X is either a divalent linkage such as —O— or is a direct linkage,
R is methyl, halogen or alkoxy group,
R' is 1,3- or 1,4-phenylene, 2:6- or 2:7 naphthylene, —$(CH_2)_y$—,
or

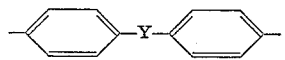

Y is —O—$(CH_2)_y$—O, —$SO_2$—, —$(CH_2)_y$— or a direct linkage,
$y$ is an integer.

It will be understood that because of the structure of the diols their combination will be equally likely to occur in either of two possible directions of reaction and that the presence of both combinations randomly in any polymer chain gives a resultant irregularity of structure. This is illustrated below for the case of an asymmetric p-phenylenedialkyl combination with the symmetrical terephthalate residue, which may occur for consecutive units in either head to tail or head to head placement in a statistical distribution.

"Head to tail" placement:

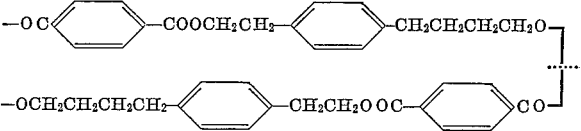

"Head to head" placement:

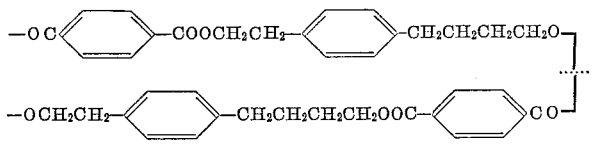

The polyesters of the present invention may be prepared by any prior art method for obtaining polyesters, such as by the reaction of diols with diacids or with diesters of dicarboxylic acids, promoted by catalysts such as have been used in the formation of prior art fibre-forming linear polyesters. Alternatively chlorides of the dicarboxylic acids may be reacted with appropriate diols either at high temperatures and, if desired, in the presence of inert diluents, or by reaction in the presence of aqueous alkali.

Suitable symmetrical dicarboxylic acids for the preparation of these polyesters are, for example, terephthalic, isophthalic, biphenyl-4:4'-dicarboxylic, naphthalene-2:6 and -2:7-dicarboxylic, diphenylsulphone-4:4'-dicarboxylic acid, α,ω-di(para carboxyphenyl) alkanes, α,ω-di(para carboxyphenoxy) alkanes, adipic acid, suberic acid and sebacic acid.

The following examples, in which all parts and percentages are by weight illustrate, but do not limit, the scope of our invention.

EXAMPLE 1

*Preparation of a polyester of repeat unit*

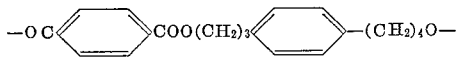

Dimethyl terephthalate (1.31 parts) and 4-(p-3-hydroxypropylphenyl)butan-1-ol (1.57 parts) were heated at 200° C. in the presence of a trace of titanium butoxide as catalyst and the initial condensation product was then polymerised by heating at 290° C./0.3 mm. of Hg for 2.5 hours. The product, which was initially amorphous, had a viscosity ratio (measured for a 1% solution in ortho-chlorophenol at 25° C.) of 1.45. When petroleum ether (B. Pt. 40–60° C.) was added to a solution of the polymer in boiling benzene, the polyester was precipitated and was recovered as a white solid (M. Pt. 95–100° C.) whose X-ray powder diffraction pattern showed distinct signs of crystallinity.

EXAMPLE 2

*Preparation of a polyester of repeat unit*

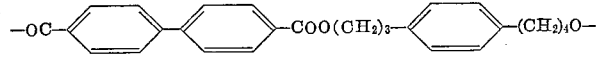

4:4'-di(methoxycarbonyl)biphenyl (1.56 parts) and 4-(p-3-hydroxypropylphenyl)butan-1-ol (1.28 parts) were condensed at 225–240° C. in the presence of a trace of titanium butoxide. The intermediate product was then polymerised at 265° C./0.15 mm. of Hg for 1.5 hours to give a solid polyester which crystallised spontaneously and melted over the range 147–152° C. The viscosity ratio of a 1% solution of the polymer in ortho-chlorophenol at 25° C. was 1.55. Fibres could readily be made from the molten polymer and were cold drawable. On X-ray diffraction examination, these fibres yielded a pattern characteristic of a highly oriented and crystalline material, from which a repeating crystal spacing of 18 A. was deduced.

EXAMPLE 3

*Preparation of a polyester of repeat unit*

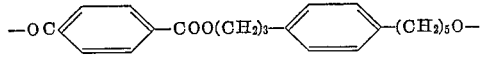

Dimethyl terephthalate (8.35 parts) and 5-(p-3-hydroxypropylphenyl)pentan-1-ol (10 parts) were condensed in the presence of a trace of titanium butoxide at 220° C. for 1 hour and polymerisation was completed by heating at 250° C./0.1 mm. of Hg for 3.5 hours. The product formed an opaque white solid on cooling and its crystallinity was confirmed by X-ray diffraction methods. The polyester had a viscosity ratio (measured for a 1% solution in ortho-chlorophenol at 25° C.) of 1.27 and melted over the range 75–77° C.

EXAMPLE 4

*Preparation of a polyester of repeat unit*

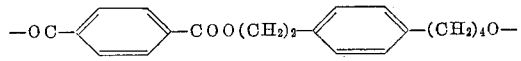

4:4'-di(methoxycarbonyl)biphenyl (11.62 parts) and 5-(p-3-hydroxy-propylphenyl)pentan-1-ol (10 parts) were condensed in the presence of titanium butoxide at 250° C. for one hour and then under vacuum (0.5 mm. of Hg) at the same temperature for a further hour. The product crystallised spontaneously on cooling. Fibres which were cold-drawable could be obtained from the molten polymer and on X-ray diffraction examination these were found to give a pattern characteristic of an oriented, crystalline substance. A repeating crystal spacing of approximately 15 A. was deduced from this pattern. The polymer, which melted over the range 139–141° C., had a viscosity ratio (measured for a 1% solution of ortho-chlorophenol at 25° C.) of 1.47.

EXAMPLE 5

*Preparation of a polyester of repeat unit*

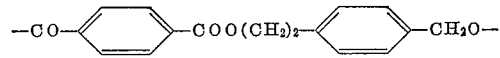

Terephthaloyl chloride (3.15 parts) and 4-(para-2-hydroxyethylphenyl)butanol (3.01 parts) were dissolved in dry ortho-dichlorobenzene (80 parts) and heated under nitrogen in an oil bath at 220° C. After hydrogen chloride had ceased to be evolved, a gelatinous mass separated from the solvent. This was separated and washed with petro ether (B. Pt. 40–60° C.) it then had a melting point of 219–222° C. and a glass-rubber transition temperature of 80° C. An X-ray powder photograph showed the polymer to be highly crystalline. Fibres could be pulled from the melt.

EXAMPLE 6

*Preparation of a polyester of repeat unit*

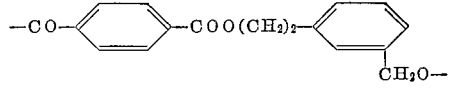

In a manner similar to that described in Example 5, equimolecular quantities of terephthaloyl chloride and para(2-hydroxyethyl)benzyl alcohol were polymerised together. The polymeric product melted over the range 185–190° C. and showed a sharp X-ray powder diagram. The viscosity ratio of a 1% solution of the polymer in ortho-chlorophenol at 25° C. was 1.24. Fibres could be pulled from the melt.

EXAMPLE 7

*Preparation of a polyester of repeat unit*

—CO—⟨⟩—COO(CH₂)₂—⟨⟩
                                ĊH₂O—

Dimethyl terephthalate (2.6 parts) and meta-(2-hydroxyethyl) benzyl alcohol (2.15 parts) were condensed in the presence of titanium butoxide as catalyst at 200° C. Polymerisation was then completed at 230° C./0.1 mm. of Hg for 1.5 hours. An initially amorphous polymer was produced on cooling which was soluble in boiling benzene; addition of petrol ether (B. Pt. 40–60° C.) to this solution caused the precipitation of a white solid, which softened over the range 50–55° C. X-ray diffraction examination of this material showed distinct though feeble signs of crystallinity. The viscosity ratio of the polymer (measured for a 1% solution in ortho-chlorophenol at 25° C.) was 1.26.

EXAMPLE 8

*Preparation of a polyester of repeat unit*

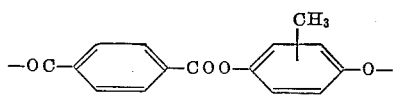

Terephthaloyl chloride (10.15 parts) and 2-methylhydroquinone (6.2 parts) were added to ortho-dichlorobenzene (200 parts) and the solution was heated, with a slow stream of nitrogen passing through it, first at 140–150° C. for 2 hours and then for a similar period under reflux. The polymeric product separated on cooling and was recovered by filtration. After washing with ortho-dichlorobenzene and drying at 100° C. it was found to crystallise above 200° C. following which it did not melt at temperatures up to 350° C. A sample annealed at 240–250° C. under reduced pressure gave a crystalline diffraction pattern when examined by X-rays.

EXAMPLE 9

*Preparation of a polyester of repeat unit*

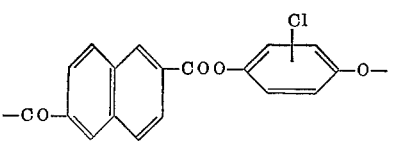

Naphthalene 2:6-dicarbonyl chloride (25.3 parts) and 2-chlorohydroquinone (14.5 parts) were added to the high-boiling solvent Aroclor 7130 (350 parts) and the mixture was heated to 190° C. with a slow stream of nitrogen passing through it. The resultant clear solution was maintained at 190° C. for 20 mins. and its temperature was then raised to 306° C. for 3 hours during which time hydrogen chloride was evolved in amount corresponding to 80% of that theoretically obtainable for complete reaction, and a precipitate of poly (2-chloro-para-phenylene naphthalene-2:6-dicarboxylate) was formed. The polymeric product was recovered by filtration of the mixture after cooling, and following washing with petroleum ether (B. Pt. 0–40° C.) it was dried, 27.9 parts being recovered. This material, which was crystalline to X-rays, did not belt below 350° C.; it was insoluble in diethyl phthalate, dibutyl phthalate, dinonyl phthalate, ortho-chlorophenol, dichloroacetic acid, trifluoroacetic acid, dimethylformamide, and in a 10% solution of lithium chloride in dimethylformamide.

EXAMPLE 10

*Preparation of a polyester of repeat unit*

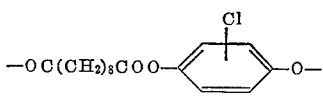

2-chlorohydroquinone diacetate (22.9 parts) and sebacic acid (20.2 parts) were mixed and heated together to 220° C. under nitrogen with a trace of magnesium as a catalyst. Acetic acid was rapidly evolved. After 2½ hours the pressure was reduced to 0.8 mm. of mercury and polymerisation was continued for 1 hour at 220° C. whereby a highly viscous melt was obtained. The product solidified on cooling to a tough, somewhat rubbery, opaque, off-white mass which melted at 105° C. and was crystalline and birefringent. The viscosity ratio of a 1% solution of the polymer in ortho-chlorophenol at 25° C. was 1.52. Fibres could be drawn from the molten polymer, and these were crystalline, oriented and birefringent.

EXAMPLE 11

*Preparation of a polyester of repeat unit*

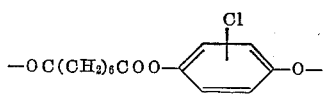

A mixture of 2-chlorohydroquinone diacetate (22.9 parts) and suberic acid (17.4 parts) with a trace of magnesium was heated to 230° C. Acetic acid was evolved rapidly and the temperature was raised during 2 hours to 290° C. and heated for a further 1½ hours at a pressure of 0.33 mm. of mercury. On cooling to room temperature the product was obtained as a tough, pale cream coloured, opaque mass which was crystalline and birefringent, and melted over 123–125° C. Fibres drawn from the molten polymer crystallized rapidly on drawing. The viscosity ratio of a 1% solution of the polymer in orthochlorophenol at 25° C. was 1.75.

EXAMPLE 12

*Preparation of a polyester of repeat unit*

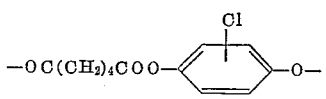

A mixture of 2-chlorohydroquinone diacetate (22.9 parts) and adipic acid (14.6 parts) with a trace of paratoluene sulphonic acid as catalyst was heated at 220–230° C. for 2 hours under an inert atmosphere. Acetic acid was evolved rapidly. Polymerisation was completed by heating the melt for a further 2 hours at 240° C. under a pressure of 0.6 mm. of mercury whereby a viscous brown liquid was obtained which solidified on cooling to an opaque grey mass. This was crystalline to X-rays and birefringent, and melted over 135–9° C. The viscosity ratio of a 1% solution of the polymer in orthochlorophenol at 25° C. was 1.31. Fibres could be drawn from the melt and after orientation these proved to be crystalline and birefringent.

EXAMPLE 13

*Preparation of a polyester of repeat unit*

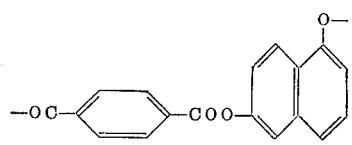

Terephthaloyl chloride (40.6 parts) and 1:6-dihydroxynaphthalene (32 parts) were dissolved in ortho-dichlorobenzene (300 parts) and the mixture was heated at 220–240° C. for 47 hours with passage of a stream of dry nitrogen. The hydrogen chloride recovered from the effluent gas stream corresponded to 86.5% of that expected for complete reaction. During the reaction the main product was deposited on the walls of the reaction vessel as a coherent film, and some further material was precipitated from the solvent after cooling; these fractions were recovered by filtration, and addition of high boiling petroleum to the filtrate gave no further precipitate. The polymeric products were washed with chloroform and dried for 24 hours at 85° C., yielding 48 parts of poly(1:6-naphthylene terephathalate). The main part of the product recovered from the walls of the reaction vessel was highly birefringent and melted over 355–365° C., the fraction recovered by precipitation on cooling was less highly birefringent and melted over 298–304° C. Both parts of the product could be pressed into tough, coherent films at a high temperature.

EXAMPLE 14

*Preparation of a polyester of repeat unit*

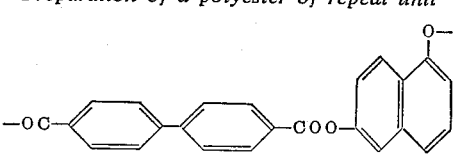

Biphenyl 4:4'-dicarbonyl chloride (55.8 parts) and 1:6-dihydroxynaphthalene (32 parts) in ortho-dichlorobenzene (300 parts) were reacted at 220–240° C. for 48 hours with passage of a stream of nitrogen according to the method of Example 13; 86% of the theoretically obtainable quantity of hydrogen chloride was recovered from the gas stream. Poly(1:6-naphthylene biphenyl-4:4'-dicarboxylate) commenced to precipitate during the heating, and a further quantity separated from the solvent on cooling to room temperature. The whole product recovered by filtration was extracted with chloroform and then dried at 85° C., yielding 54 parts of polymer. This material was not of high birefringence initially, but its birefringence increased on heating, the product being still unmelted at 365° C.

EXAMPLE 15

*Preparation of a polyester of repeat unit*

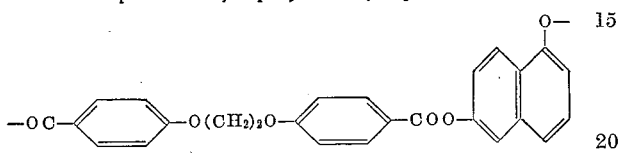

1:2 - di(para - chlorocarbonylphenoxy)ethane (67.8 parts) and 1:6-dihydroxynaphthalene (32 parts) in ortho-dichlorobenzene (300 parts) were reacted at 210–240° C. for 26 hours with passage of a stream of nitrogen according to the method of Example 13; 91.3% of theoretical quantity of hydrogen chloride for complete reaction was recovered from the gas stream. The product was wholly soluble in the hot ortho-dichlorobenzene, but on cooling 65 parts of poly(1:6-naphthylene 1:2-diphenoxyethane-4:4'-dicarboxylate) were precipitated and recovered by filtration whilst an additional 4 parts were obtained by addition of light petroleum to the mother liquors. Both fractions were crystalline and birefringent, the larger fraction melting over 248–252° C. and the lesser one over 230–234° C. Both fractions could be pressed into tough, coherent films at a high temperature.

EXAMPLE 16

*Preparation of a polyester of repeat unit*

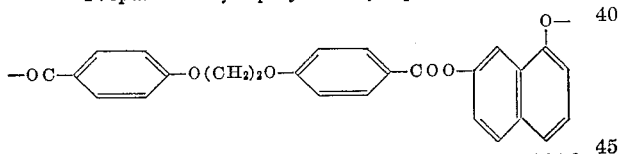

1:2 - di(para - chlorocarbonylphenoxy)ethane (67.8 parts) and 1:7-dihydroxynaphthalene (32 parts) in 300 parts of ortho-dichlorobenzene were reacted for 25 hours at 210–240° C. with passage of a stream of nitrogen according to the method of Example 13; 97.5% of the theoretically obtainable quantity of hydrogen chloride for complete reaction was recovered from the gas stream. The polymeric product, which was soluble in dichlorobenzene even in the cold, was recovered by addition of petroleum to the cooled reaction mixture and, after filtration and washing, amounted to 78 parts of poly(1:7-naphthylene 1:2-diphenoxyethane - 4:4'-dicarboxylate). This material was birefringent as obtained, and on heating it appeared to soften at about 155° C., which may correspond to the region of the glass transition temperature, following which it resolidified with the development of intense birefringence, finally melting over 215–222° C. The product could be pressed into tough, coherent films at a high temperature.

EXAMPLE 17

*Preparation of a polyester of repeat unit*

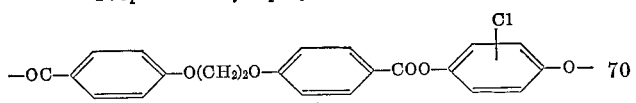

A mixture of 1:2-di(para-chlorocarbonylphenoxy)ethane (33.9 parts) and 2-chlorohydroquinone (14.5 parts) in 35 parts of the solvent Aroclor 7132 was heated slowly to 200° C. with passage of a rapid stream of nitrogen. After 20 minutes at 200° C. followed by heating for 45 minutes at 306° C., 99% of the theoretically obtainable quantity of hydrogen chloride for complete reaction had been evolved. A polymeric product separated from the solution during the latter stages of the reaction and further material came out on cooling. This was recovered by filtration, washed with petroleum ether (B. Pt. 40–60° C.) and dried. The poly(2-chloro-para-phenylene 1:2 - diphenoxyethane-4:4'-dicarboxyllate) so obtained amounted to 37.6 parts; it was weakly birefringent at ordinary temperatures and its birefringence increased with temperature, the material being melted with discolouration over the range 350–375° C. It was insoluble in ortho-dichlorobenzene, dimethylformamide, dibutyl phthalate, dichloroacetic acid, meta-cresol and tetrachloroethane.

EXAMPLE 18

*Preparation of a polyester of repeat unit*

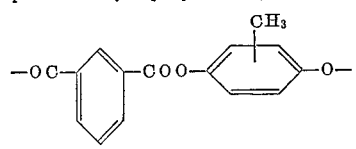

A mixture of 2-methylhydroquinone (11.8 parts) and isophthaloyl chloride (20.3 parts) in 35 parts of the solvent Aroclor 7132 was heated to 200° C. with passage of a slow stream of nitrogen. After 70 minutes at 200° C. followed by heating for 3½ hours at 306° C., 96.5% of the theoretically obtainable quantity of hydrogen chloride for complete reaction had been recovered from the effluent gas stream. The solution on cooling to room temperature, deposited a mass of polymeric product which was recovered by filtration, washed with petroleum ether and dried. The poly(2-methyl-para-phenylene isophthalate) so obtained amounted to 21.3 parts; it was crystalline, melting without decomposition over 310–313° C., and the viscosity ratio of its 1% solution in ortho-chlorophenol at 25° C. was 1.6. A solution of the polymer in Aroclor 7132 at an elevated temperature was used to coat metal surfaces; coherent films were obtained.

EXAMPLE 19

*Preparation of a polymer of repeat unit*

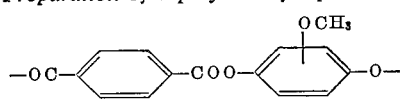

Terephthaloyl chloride (20.3 parts) and methoxy-hydroquinone (14.0 parts) were heated slowly in Aroclor 7133 (a mixture of chlorinated polyphenyls, 300 parts) while a stream of nitrogen was passed through the mixture. After two hours the temperature had reached 250° C. and 90% of the theoretical amount of HCl had been evolved. A solid product separated from the hot solution, and heating was continued at 300° C. for two hours, by which time 95% of amount of HCl theoretically obtainable for full reaction had been evolved.

After allowing the mixture to cool, the product was separated by filtration, washed with chloroform and dried in vacuo at 130° C. The pale cream product was birefringent and crystalline, and did not melt below 320° C.

EXAMPLE 20

*Preparation of a polymer of repeat unit*

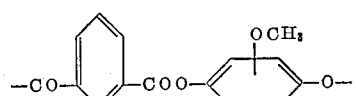

The reaction was carried out as in the previous example using equimolecular amounts of isophthaloyl chloride and methoxyhydroquinone. The reaction was continued until 92% of the amount of HCl theoretically obtainable for full reaction had been evolved. The product was birefringent and crystalline and did not melt below 320° F.

EXAMPLE 21

*Preparation of a polymer of repeat unit*

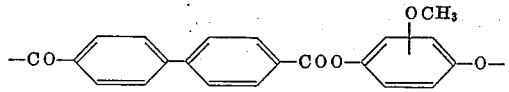

The reaction was carried out as in the previous two examples using equimolecular amounts of biphenyl-4:4′-dicarbonylchloride and methoxy-hydroquinone. 95% of the theoretically obtainable amount of HCl for full reaction was evolved. The product was crystalline, and birefringent, and did not melt below 320° C.

What we claim is:

1. Linear, crystalline polyesters containing repeating units of the formula:

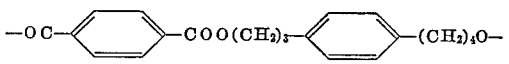

2. Linear, crystalline polyesters containing repeating units of the formula:

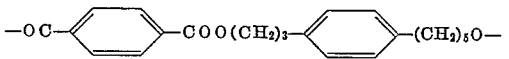

3. Linear, crystalline polyesters containing repeating units of the formula:

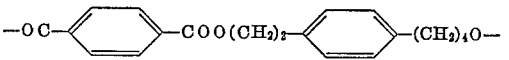

4. Linear, crystalline polyesters containing repeating units of the formula:

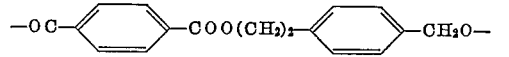

5. Linear, crystalline polyesters containing repeating units of the formula:

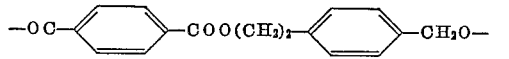

6. Linear, crystalline polyesters containing repeating units of the formula:

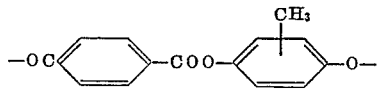

7. Linear, crystalline polyesters containing repeating units of the formula:

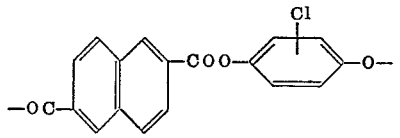

8. Linear, crystalline polyesters containing repeating units of the formula:

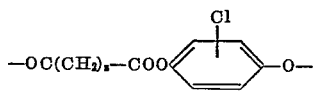

where $z$ is taken from the group consisting of 4, 6 and 8.

9. Linear, crystalline polyesters containing repeating units of the formula:

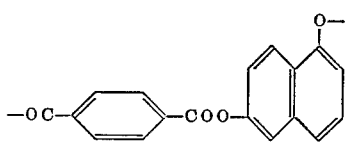

10. Linear, crystalline polyesters containing repeating units of the formula:

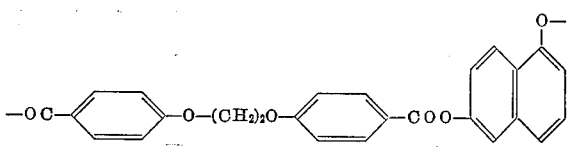

11. Linear, crystalline polyesters containing repeating units of the formula:

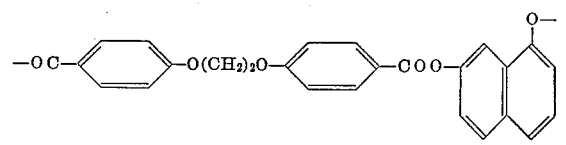

12. Linear, crystalline polyesters containing repeating units of the formula:

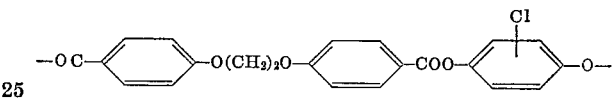

13. Linear, crystalline polyesters containing repeating units of the formula:

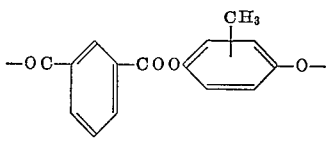

14. Linear, crystalline polyesters containing repeating units of the formula:

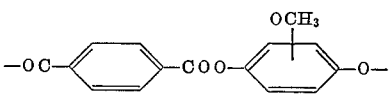

15. Linear, crystalline polyesters containing repeating units of the formula:

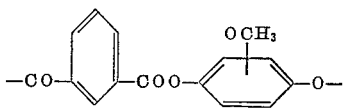

16. Novel, linear, fiber-forming, crystalline polyesters containing repeating units of at least one of the formulae: $a$, $b$, $c$ and $d$ where $a$, $b$, $c$ and $d$ are defined as follows:

(a)

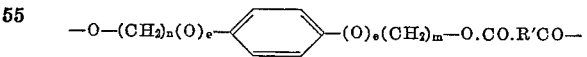

(b)

(c)

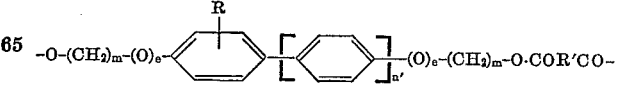

(d) —O($C_{10}H_6$)O.COR′CO— where

—($C_{10}H_6$) is the naphthylene group attached to the oxygen atoms shown in Formula $d$ at a position selected from the group consisting of the 1:2, 1:3, 1:6 and 1:7 positions, $n$ and $m$ are dissimilar integers up to 5, $n'$ is selected from the groups consisting of 0 and 1,
R is selected from the group consisting of methyl halogen and lower alkoxy groups,
R' is selected from the group consisting of 1:3- and 1:4-phenylene, 2:6- and 2:7-naphthylene, —(CH$_2$)$_y$—
and

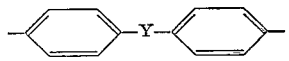

Y is selected from the group consisting of
—O(CH$_2$)$_y$—O—, —SO$_2$—, and —(CH$_2$)$_y$—,
$y$ is an integer from 1 to 8,
$e$ is selected from the group consisting of 0 and 1.

References Cited by the Examiner

FOREIGN PATENTS

| | | |
|---|---|---|
| 813,239 | 5/1959 | Great Britain. |
| 885,049 | 12/1961 | Great Britain. |
| 968,403 | 9/1964 | Great Britain. |

WILLIAM H. SHORT, *Primary Examiner.*

C. A. WENDEL, *Assistant Examiner.*